(12) United States Patent
Yasuma

(10) Patent No.: US 8,698,923 B2
(45) Date of Patent: Apr. 15, 2014

(54) IMAGE PROCESSING DEVICE, IMAGE PROCESSING METHOD, AND PROGRAM FOR DETECTING AND CORRECTING DEFECTIVE PIXEL IN IMAGE

(75) Inventor: Fumihito Yasuma, Tokyo (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 13/344,152

(22) Filed: Jan. 5, 2012

(65) Prior Publication Data

US 2012/0182452 A1 Jul. 19, 2012

(30) Foreign Application Priority Data

Jan. 14, 2011 (JP) ................ P2011-006464

(51) Int. Cl.
*H04N 9/64* (2006.01)
(52) U.S. Cl.
USPC ........................................ 348/246
(58) Field of Classification Search
USPC ........................................ 348/246
See application file for complete search history.

(56) References Cited

U.S. PATENT DOCUMENTS

| 2004/0161153 | A1* | 8/2004 | Lindenbaum | 382/209 |
| 2005/0088550 | A1* | 4/2005 | Mitsunaga et al. | 348/272 |
| 2006/0012695 | A1* | 1/2006 | Chang et al. | 348/246 |
| 2008/0247671 | A1* | 10/2008 | Yasuma et al. | 382/300 |
| 2009/0303357 | A1* | 12/2009 | Tajima et al. | 348/246 |
| 2010/0026862 | A1* | 2/2010 | Nishiwaki | 348/246 |
| 2012/0250994 | A1* | 10/2012 | Shinozaki et al. | 382/167 |
| 2013/0051665 | A1* | 2/2013 | Shinozaki | 382/167 |

* cited by examiner

*Primary Examiner* — Tuan Ho
*Assistant Examiner* — Shahbaz Nazrul
(74) *Attorney, Agent, or Firm* — Sherr & Jiang, PLLC

(57) ABSTRACT

An image processing device includes a texture direction determining unit that determines a texture direction of an image, a defective pixel detecting unit that calculates a pixel value average for each of pixel groups including a plurality of pixels, and detects a defective pixel position on the basis of difference information of the pixel value average according to an arrangement direction of the pixel groups, and a correction unit that corrects, as a correction target, a pixel value at the defective pixel position detected on the basis of the difference information in the same pixel group arrangement direction as the texture direction determined by the texture direction determining unit.

21 Claims, 12 Drawing Sheets gradH (x, y) = |w (x−1, y) −w (x+1, y)| gradV (x, y) = |w (x, y−1) −w (x, y+1)| gradA (x, y) = |w (x, y) −w (x+1, y−1)| gradD $(x, y) = |w(x, y) - w(x+1, y+1)|$

IMAGE PROCESSING DEVICE, IMAGE PROCESSING METHOD, AND PROGRAM FOR DETECTING AND CORRECTING DEFECTIVE PIXEL IN IMAGE

BACKGROUND

The present disclosure relates to an image processing device, an image processing method, and a program, and more particularly, to an image processing device, an image processing method, and a program, which correct a signal output from a defective pixel included in a solid-state imaging device to suppress image quality deterioration caused by the defective pixel.

Generally, in a solid-state imaging element such as a CCD (Charge Coupled Device) and a CMOS (Complementary Metal Oxide Semiconductor) sensor, defective pixels may be included.

That is, in such a solid-state imaging element, a defective pixel may be caused by a partial crystal defect of a semiconductor and output an abnormal imaging signal, thereby causing image quality deterioration. For example, there is a black spot image defective pixel or a white spot defective pixel. Various signal processing methods and circuit configurations have been proposed for correcting a signal output from the defective pixel.

In the related art disclosing a technique of correcting a signal output from a defective pixel, there are, for example, Japanese Unexamined Patent Application Publication No 2009-290653, Japanese Patent No. 4343988, and Japanese Patent No. 4307318.

SUMMARY

In the related art described above, however, when detective pixels continuously occur or when a defect occurs at a circuit part (for example, a transistor) shared by a plurality of pixels and defects occur in the plurality of pixels, it is difficult to acquire a texture direction accurately and therefore it is difficult to sufficiently correct the defective pixels.

When the correction process disclosed in the related art is applied, only the center pixel is to be corrected in a neighboring area used in the defect correction. For example, when a signal process is performed at a later stage using the neighboring area used for the defect correction and the defect is included in pixels other than the center pixel, the defective pixel which has not been corrected may influence the signal process of the later stage and it is difficult to obtain the correction effect. Accordingly, in the method of the related art, it is necessary to perform the signal process of the later stage after the defect correction is performed on all the pixels once, which causes a problem of an increase of a circuit scale or a delay of a process speed.

It is desirable to provide an image processing device, an image processing method, and a program that perform a determination process in which an influence of a defect is reduced when determining a direction of a texture so as to efficiently perform detection and correction of a defect even when there are a plurality of defective pixels in the neighboring area.

According to a first embodiment of the present disclosure, there is provided an image processing device including a texture direction determining unit that determines a texture direction of an image, a defective pixel detecting unit that calculates a pixel value average for each of pixel groups including a plurality of pixels and detects a defective pixel position on the basis of difference information of the pixel value average according to an arrangement direction of the pixel groups, and a correction unit that corrects, as a correction target, a pixel value at the defective pixel position detected on the basis of the difference information in the same pixel group arrangement direction as the texture direction determined by the texture direction determining unit.

In the image processing device according to the embodiment of the present disclosure, the defective pixel detecting unit may calculate the pixel value average for each pixel group including the plurality of pixels sharing a pixel value reading circuit and detect the defective pixel position on the basis of the difference information of the pixel value average according to the arrangement direction of the pixel group.

In the image processing device according to the embodiment of the present disclosure, the defective pixel detecting unit may determine whether or not a pixel is a defective pixel in accordance with a difference value from a reference value (safe_mW), the reference value being an average value of a plurality of pixel groups in a flat area where a difference from the average value of a plurality of pixel group units is small in a plurality of adjacent arrangements of pixel groups in the same arrangement direction.

In the image processing device according to the embodiment of the present disclosure, the texture direction determining unit may perform a process of determining one of the four directions of the horizontal, vertical, upper right, and lower right directions as the texture direction, and the defective pixel detecting unit may detect the defective pixel position on the basis of the difference information of the pixel value average according to the arrangement direction of the pixel groups in the four directions of horizontal, vertical, upper right, and lower right.

In the image processing device according to the embodiment of the present disclosure, the texture determining unit may calculate a plurality of differential values based on pixel values of pixels arranged in a predetermined direction included in a neighboring area centered on a pixel for attention, sort the plurality of differential values, select only data with small values, calculate statistics, and determine the texture direction on the basis of comparison of the statistics.

In the image processing device according to the embodiment of the present disclosure, the correction unit performs a process of determining the pixel value at the defective pixel position with reference to a neighboring pixel in the texture direction as a reference pixel on the basis of the pixel value of the reference pixel.

In the image processing device according to the embodiment of the present disclosure, as a process target, the defective pixel detecting unit may calculate a pixel value average for each pixel group including a plurality of pixels in the same pixel group arrangement direction as the texture direction determined by the texture direction determining unit, and detect the defective pixel position on the basis of the difference information of the pixel value averages according to the arrangement direction of the pixel groups.

According to a second embodiment of the present disclosure, there is provided an image processing method performed in an image processing device, the method including causing a texture direction determining unit to determine a texture direction of an image, causing a defective pixel detecting unit to calculate a pixel value average for each of pixel groups including a plurality of pixels and to detect a defective pixel position on the basis of difference information of the pixel value average according to an arrangement direction of the pixel group, and causing a correction unit to correct, as a correction target, the defective pixel at the defective pixel position detected on the basis of the difference information in the same pixel group arrangement direction as the texture direction determined by the texture direction determining unit.

According to a third embodiment of the present disclosure, there is provided a program for causing an image processing device to execute an image process including causing a texture direction determining unit to determine a texture direction of an image, causing a defective pixel detecting unit to calculate a pixel value average for each of pixel groups including a plurality of pixels and to detect a defective pixel position on the basis of difference information of the pixel value average according to an arrangement direction of the pixel group, and causing a correction unit to correct, as a correction target, the defective pixel at the defective pixel position detected on the basis of the difference information in the same pixel group arrangement direction as the texture direction determined by the texture direction determining unit.

The program according to the embodiment of the present disclosure is, for example, a program which can be provided with a computer-readable storage medium or communication medium usable in a general-purpose system which can execute a variety of program code. Such a computer-readable program is provided to perform a process according to the program on a computer system.

Other characteristics and advantages of the present disclosure will be clarified by detailed description based on examples of the present disclosure and the accompanying drawings. In the specification, a system is referred to as a logical group configuration of a plurality of devices, and the devices are not necessarily provided in the same casing.

According to an embodiment of the present disclosure, a configuration of performing detection and correction of influence of a defective pixel on a captured image is realized. Specifically, a texture direction of an image is determined, a pixel value average is calculated for each pixel group including a plurality of pixels, and a defective pixel position is detected on the basis of difference information of the pixel value average according to an arrangement direction of the pixel group. A pixel value at the defective pixel position detected in the same pixel group arrangement direction as the texture direction is corrected as a correction target. Defective pixel detection is performed at a position in the texture direction, for example, on each pixel group sharing a reading circuit to efficiently detect the defective pixel position.

DETAILED DESCRIPTION OF EMBODIMENTS

Hereinafter, an image processing device, an image processing method, and a program according to an embodiment of the present disclosure will be described in detail with reference to the drawings. An embodiment described herein is implemented by an imaging device system. First, a configuration and an operation of an overall system will be described, and a process according an embodiment of the present disclosure will be described in detail. The description is provided as follows.

Figure 1:
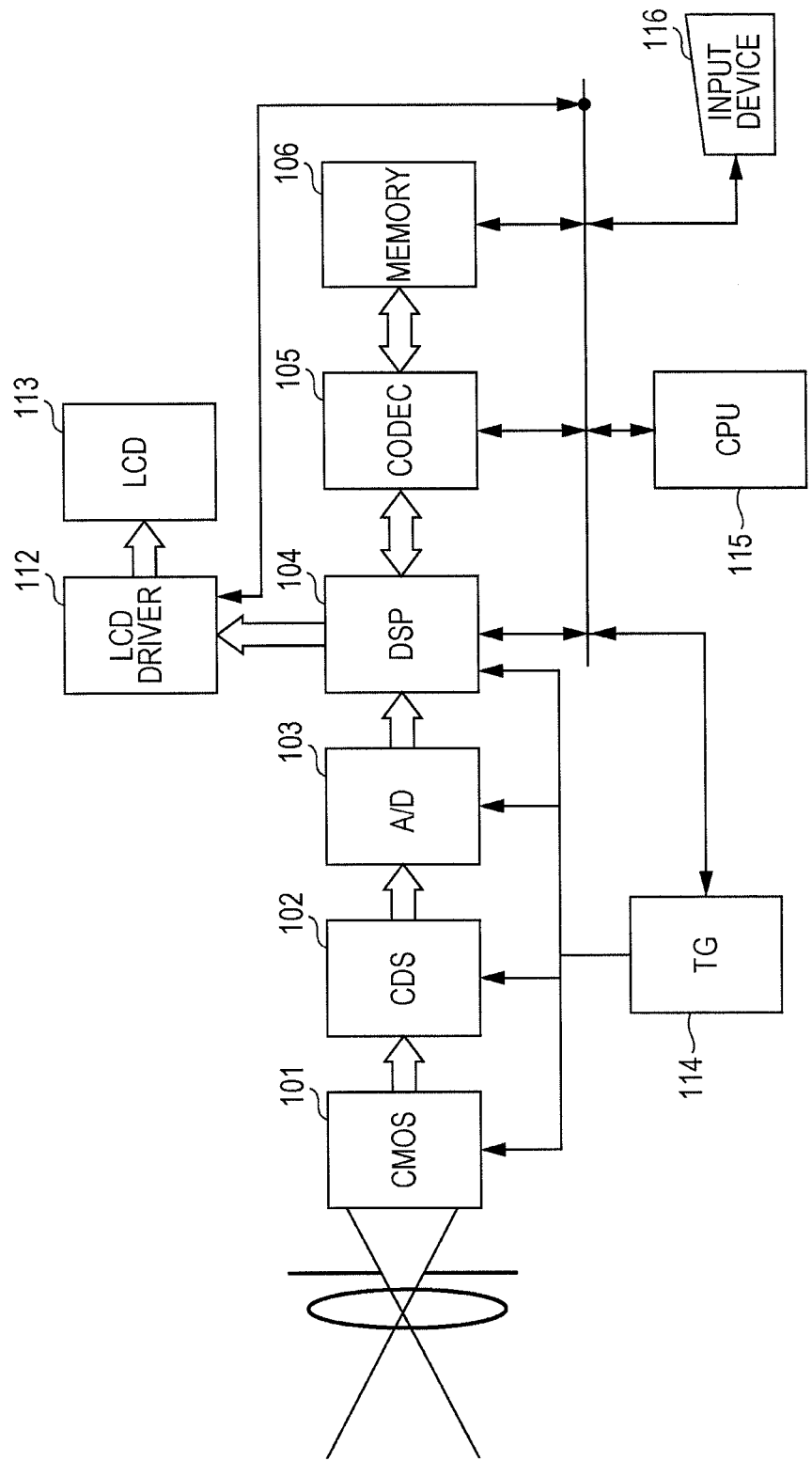
FIG. 1 is a diagram illustrating an example of a configuration of an image processing device according to an embodiment of the present disclosure.

1. Example of Configuration of Image Processing Device
2. Details of Image Process according to Embodiment of Present Disclosure
3. Details of Configuration and Process of Defect Correcting Unit
4. Details of Process performed by Neighboring Area Extracting Unit in Defect Correcting Unit
5. Details of Process performed by Texture Direction Determining Unit in Defect Correcting Unit
6. Details of Process performed by Defective Pixel Detecting Unit in Defect Correcting Unit
7. Process of Defective Pixel Correcting Unit 1. Example of Configuration of Image Processing Device FIG. 1 is an overall diagram of an imaging device (digital video camera) that is an example of an image processing device according to an embodiment of the present disclosure. The imaging device mainly includes an optical system, a signal processing system, a recording system, a display system, and a control system. Incident light passing through the optical system including a lens and the like reaches an imaging element 101 such as CMOS. The light first reaches light receiving elements of a CMOS imaging face, and is converted into an electrical signal by photoelectric conversion in the light receiving element. Noise is removed by a correlation double sampling circuit (CDS) 102, the signal is converted into digital data by a digitizing process of an analogue-to-digital (A/D) converter 103, then the digital data is temporarily stored in an image memory of a DSP 104, and various signal processes are performed in the DSP 104.

In the imaging state, a timing generator (TG) 114 controls the signal processing system to keep image reading at a regular frame rate.

The A/D convertor 103 outputs a pixel stream at a regular rate to the DSP 104 where various image processes are performed, and then the image data is transmitted to an LCD driver 112, a CODEC 105, or both of them. The LCD driver 112 converts the image data transmitted from the DSP 104 into an analog signal, and the analog signal is output to and displayed on an LCD 113. For example, the LCD 113 serves as a finder of a camera. The CODEC 105 performs encoding of the image data transmitted from the DSP 104, and the encoded image data is recorded in a memory 106.

The memory 106 may be a recording device using a semiconductor, a magnetic recording medium, an optical magnetic recording medium, an optical recording medium, and the like.

For example, a CPU 115 performs an overall process control of an imaging process and an image process according to a program stored in a storage unit in advance.

An input unit 116 is an operation unit operated by a user.

The above description is description of an overall system of a digital video camera of the embodiment.

In the imaging device shown in FIG. 1, for example, the DSP 104 mainly performs the processes according to an embodiment of the present disclosure. Hereinafter, an image process according to an embodiment of the present disclosure will be described in detail. In the following embodiment, the DSP 104 performs the image process according to an embodiment of the present disclosure, but other hardware or software than the DSP 104 may be used to perform the process according to an embodiment of the present disclosure. The other constituent element, for example, the CMOS 101 may perform the image process.

2. Details of Image Process According to Embodiment of Present Disclosure

As described above, for example, the image process according to an embodiment of the present disclosure can be performed by the DSP 104.

Accordingly, in the configuration of the embodiment described hereinafter, an example will be described in which an operation unit in the DSP 104 sequentially performs operations in the image process in accordance with predetermined program code on a stream of the image signal input to the DSP 104.

In the embodiment described hereinafter, each process unit in the program will be described as a functional block, and a sequence of performing each process will be described using a flowchart. However, an embodiment of the present disclosure may be implemented by hardware, for example, by mounting a hardware circuit realizing a process equivalent to the process executed by the functional block described hereinafter, in addition to being implemented by the form of the program described in the embodiment.

Figure 2:
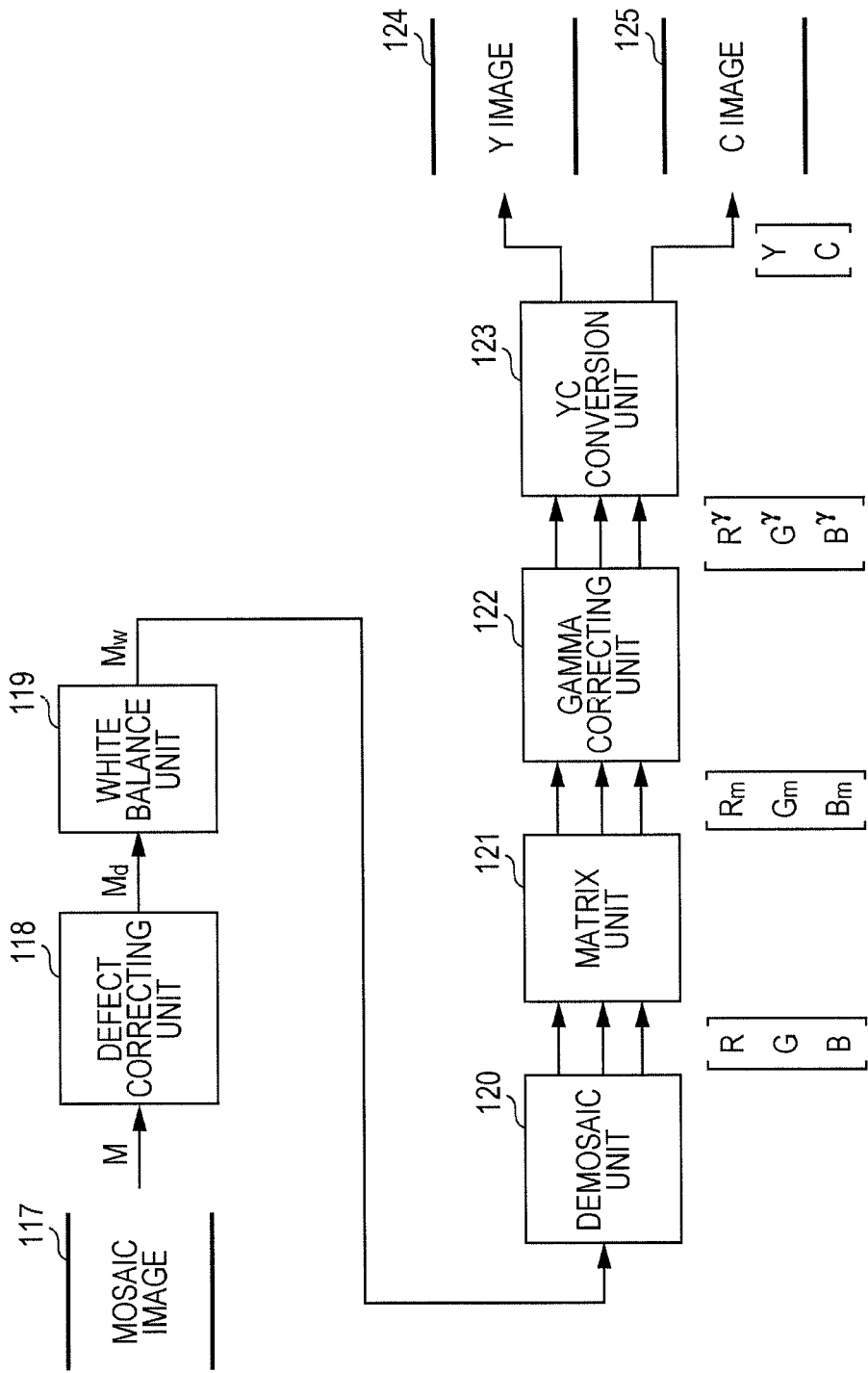
FIG. 2 is a diagram illustrating an example of a configuration of an image processing unit of the image processing device according to the embodiment of the present disclosure.

FIG. 2 is a block diagram illustrating an example of a configuration of an image processing unit performing the image process according to an embodiment of the present disclosure. As described above, the image processing unit is configured by, for example, the DSP 104 shown in FIG. 1. In FIG. 2, mosaic image 117, Y image 124, and C image 125 represented by two parallel horizontal lines indicate data or memories storing data, and the other configurations including defect correcting unit 118 to YC conversion unit 123 represent processes performed in the image processing unit or process units.

As shown in FIG. 2, the image processing unit includes a defect correcting unit 118, a white balance unit 119, a demosaic unit 120, a matrix unit 121, a gamma correcting unit 122, and a YC conversion unit 123. The mosaic image 117 represents an input image to the image processing unit, that is, an image signal input to the DSP 104 digitized by the A/D convertor 103 shown in FIG. 1.

The mosaic image 117 is provided by storing an intensity signal (pixel value) of any of colors R, G, and B in a corresponding pixel of the imaging element 101 as shown in FIG. 1, and the color arrangement is, for example, a primary color system Bayer arrangement.

The Y image 124 and the C image 125 are images output from the image processing unit. Those images correspond to a YCbCr image signal output from the DSP 104 and input to the CODEC 105 as shown in FIG. 1.

The processes performed by the units of the image processing unit shown in FIG. 2 will be described.

The defect correcting unit 118 corrects a pixel value of a defective pixel position into an accurate value in the mosaic image 117 input from the A/D converter 103 shown in FIG. 1.

A white balance unit 119 sets a proper coefficient in response to a color of each pixel intensity such that a color balance of an achromatic color photography subject area is an achromatic color with respect to the defect-corrected mosaic image.

The demosaic unit 120 performs an interpolation process so as to have the same intensities of R, G, and B at the pixel positions of the mosaic image subjected to the white balance adjustment. Outputs from the demosaic unit 120 are three images in which pixel values of three colors of R, G, and B are individually set at the pixel positions.

The matrix unit 121 applies a 3-row and 3-column linear matrix to which a coefficient is set in advance to the pixels [R, G, and B] of the outputs of the demosaic unit 120, and converts them into pixel values of three primary colors (intensity values R_m, G_m, and B_m). The coefficient of the linear matrix is an important design item to exhibit optimal color representation, but the embodiment of the present disclosure relates to the defect correcting process. The matrix process is applied after the defect correcting process, and thus a specific value of a linear matrix coefficient may be designed irrespective of the embodiment of the present disclosure.

The outputs of the matrix unit 121 are three images corresponding to three colors of color-corrected R_m, G_m, and B_m. After the matrix process, the gamma correcting unit 122 performs gamma correction on a color-corrected 3-channel image.

The YC conversion unit 123 performs a YC matrix process and band restriction for a chroma component on the gamma-corrected 3-channel image to generate the Y image 124 and the C image 125.

Figure 3:
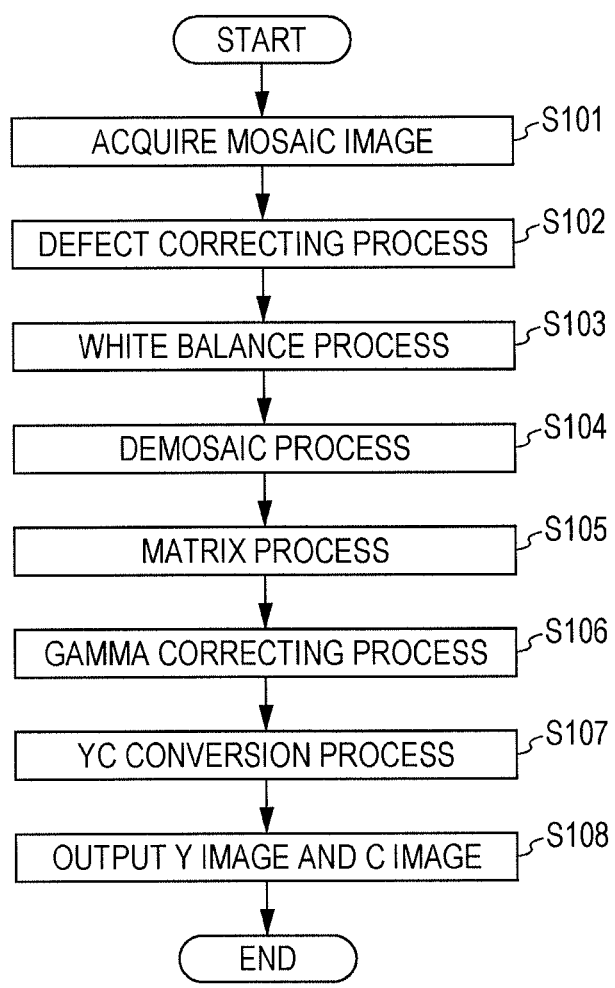
FIG. 3 is a flowchart illustrating a process sequence performed by the image processing device according to the embodiment of the present disclosure.

Next, a sequence of the process performed by the image processing unit shown in FIG. 2 will be described with reference to a flowchart shown in FIG. 3.

First, in Step S101, the image processing unit acquires a mosaic image based on an output signal of the image processing element 101. The image is the mosaic image 117 shown in FIG. 2.

Then, in Step S102, the defect correcting unit 118 performs the defect correcting process on the mosaic image.

Then, in Step S103, the white balance unit 119 performs the white balance process on the defect-corrected mosaic image.

Then, in Step S104, the demosaic unit 120 performs the demosaic process of setting all the intensities (pixel values) of R, G, and B at the pixel positions of the mosaic image subjected to the white balance process.

Then, in Step S105, the matrix unit 121 applies the linear matrix to the pixels of the 3-channel images and obtains an RGB 3-channel image.

Then, in Step S106, the gamma correcting unit 122 performs the gamma correction on the pixels of the 3-channel image color-corrected by the matrix process.

Then, in Step S107, the YC conversion unit 123 performs YC conversion on the gamma-corrected 3-channel image to generate the Y image 124 and the C image 125.

Last, in Step S108, the generated Y image 124 and C image 125 are output.

As described above, the operation of the image processing unit is completed.

3. Details of Configuration and Process of Defect Correcting Unit

Next, the image correcting process which is a main part of the embodiment of the present disclosure and is performed in the defect correcting unit 118 will be described in detail.

Figure 4:
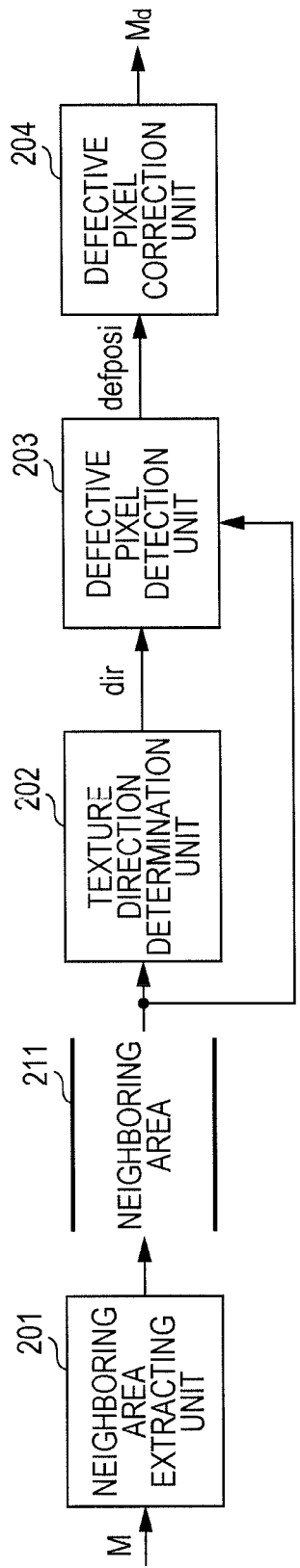
FIG. 4 is a diagram illustrating an example of a configuration of a defective pixel correcting process of the image processing device according to the embodiment of the present disclosure.

FIG. 4 shows a block diagram illustrating an internal configuration of the defect correcting unit 118.

As shown in FIG. 4, the defect correcting unit 118 mainly includes a neighboring area extracting unit 201, a texture direction determining unit 202, a defective pixel detecting unit 203, and a defective pixel correcting unit 204.

The neighboring area extracting unit 201 cuts out a neighboring area 211 in specific size including a position of a pixel for attention and its neighboring area, from the mosaic image 117 input to the defect correcting unit 118, that is, the mosaic image 117 based on the output signal of the imaging element 101 shown in FIG. 1. In the embodiment, the neighboring area 211 is a rectangular area of 7×7 pixels centered on the position of the pixel for attention.

The texture direction determining unit 202 determines a direction of performing the process of detecting the defective pixel in a plurality of directions, at the position of the pixel for attention set to the center position of the rectangular area of 7×7 pixels. In the embodiment, the plurality of determination directions of the texture direction determining unit 202 are four directions of:

Horizontal Direction (H direction),
Vertical Direction (V direction),
Upper Right Direction (A direction), and
Lower Right Direction (D direction).

The defective pixel detecting unit 203 performs the detection of the defective pixel according to the direction of performing the process of detecting the defective pixel determined by the texture direction determining unit 202.

The defective pixel correcting unit 204 corrects the pixel value of the defective pixel position detected by the defective pixel detecting unit 203, using the pixels of the neighboring area 211.

The defect correcting unit 118 performs the correction of the defective pixel by such a series of processes. Hereinafter, an example of specific processes of the process units constituting the defect correcting unit 118 will be sequentially described.

4. Details of Process Performed by Neighboring Area Extracting Unit in Defect Correcting Unit First, details of the process performed by the neighboring area extracting unit 201 in the defect correcting unit 118 will be described.

The neighboring area extracting unit 201 performs an operation of securing an access to pixel information in the 7×7 rectangular area in the vicinity of the position of the pixel for attention. As a specific method thereof, various methods can be applied. For example, when the embodiment of the present disclosure is realized as software, the pixel values in the neighboring 7×7 rectangular area centered on the position of the pixel for attention are secured in a memory in the form of arrangement in which the pixel values are associated with, for example, coordinate positions.

When the embodiment of the present disclosure is realized as hardware, a signal processing system of a general imaging device is often implemented such that a signal from a sensor flows sequentially as data in a first-order series of pixel intensities with a horizontal line. In this case, generally, an access to the pixels of the horizontal line adjacent in the vertical direction is secured using a delay line capable of storing the pixel intensities (pixel values) of one horizontal line.

At least six delay lines are prepared to secure the access to the 7×7 rectangular area.

5. Details of Process performed by Texture Direction Determining Unit in Defect Correcting Unit Next, details of the process performed by the texture direction determining unit 202 in the defect correcting unit 118 will be described.

Figure 5:
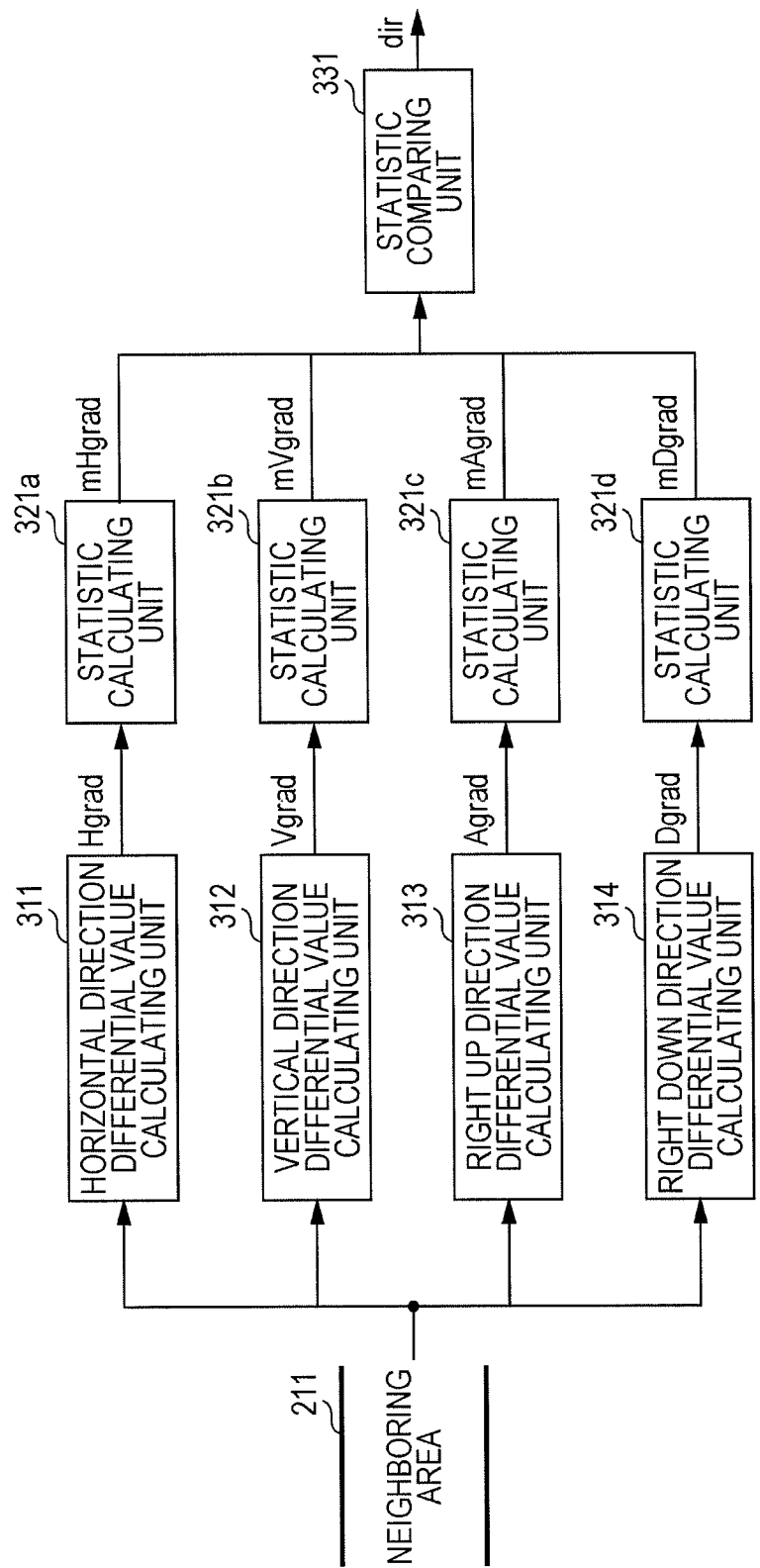
FIG. 5 is a diagram illustrating a texture direction determining process performed in the defective pixel correction process of the image processing device according to the embodiment of the present disclosure.

FIG. 5 is a diagram illustrating a detailed configuration and operation of the texture direction determining unit 202.

The texture direction determining unit 202 has the following differential value calculating units performing pixel value analysis of the neighboring area (in the example, 7×7 pixel area) of the pixel for attention:

(1) Horizontal Direction Differential Value Calculating Unit 311 calculating Differential Value in Horizontal Direction, (2) Vertical Direction Differential Value Calculating Unit 312 calculating Differential Value in Vertical Direction, (3) Upper Right Direction Differential Value Calculating Unit 313 calculating Differential Value in Upper Right Direction, and (4) Lower Right Direction Differential Value Calculating Unit 314 calculating Differential Value in Lower Right Direction.

In the embodiment, the neighboring area is an area of 7×7 pixels centered on the pixel for attention, and analysis is performed on the neighboring area.

The texture direction determining unit 202 further includes statistic calculating units 321a to 321d calculating statistics from the differential values calculated regarding four directions, and a statistic comparing unit 331 determining the direction of the texture in the neighboring area 211 by comparing the statistics of the directions.

The process of the horizontal direction differential value calculating unit 311 calculating the differential value in the horizontal direction will be described with reference to the drawings.

Figure 6:
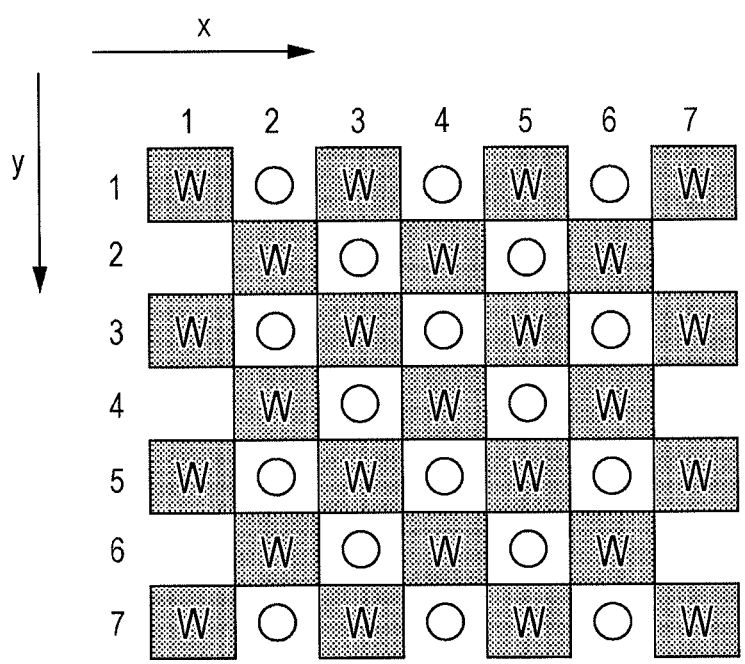
FIG. 6 is a diagram illustrating a horizontal direction differential value calculating process performed in the texture direction determining process performed by the image processing device according to the embodiment of the present disclosure.

FIG. 6 is a diagram illustrating the process of the horizontal direction differential value calculating unit 311. FIG. 6 shows the neighboring area of 7×7 pixels centered on the pixel for attention.

The horizontal direction is represented by the x coordinate, and the vertical direction is represented by the y coordinate. The center of the neighboring area of 7×7 pixels, that is, (x, y)=(4, 4) corresponds to the position of the pixel for attention.

The pixel used in the texture direction determination is represented by W. At the pixel position (x, y), the horizontal direction differential value gradH(x, y) is acquired by the following formula:

$$gradH(x,y)=abs(w(x-1,y)-w(x+1,y))$$

where abs( ) is a function of acquiring an absolute value, w(x−1, y) is a pixel value (intensity) of W at the coordinate position (x−1, y), and w(x+1, y) is a pixel value (intensity) of W at the coordinate position (x+1, y).

The horizontal direction differential value calculating unit 311 acquires the differential value gradH at the pixel positions indicated by symbol O in FIG. 6.

For example, at the position of symbol O of the position of (x, y)=(2, 1), the differential value gradH is acquired on the basis of the pixel values (intensities) of both neighboring W in the horizontal direction.

That is, the differential value gradH(2, 1) is calculated using the pixel values of two W pixels of (x, y)=(1, 1) and (x, y)=(3, 1).

The differential values gradH are acquired at eighteen pixel positions indicated by symbol O in FIG. 6.

Next, the process of the vertical direction differential value calculating unit 312 calculating the differential value in the vertical direction will be described.

Figure 7:
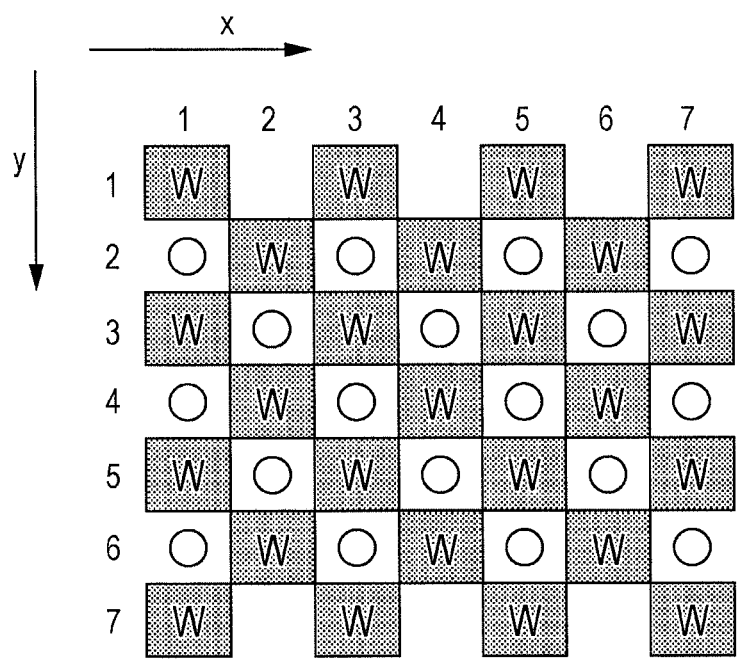
FIG. 7 is a diagram illustrating a vertical direction differential value calculating process performed in the texture direction determining process performed by the image processing device according to the embodiment of the present disclosure.

FIG. 7 is a diagram illustrating the process of the vertical direction differential value calculating unit 312. FIG. 7 shows the neighboring area of 7×7 pixels centered on the pixel for attention.

The horizontal direction is represented by the x coordinate, and the vertical direction is represented by the y coordinate. The center of the neighboring area of 7×7 pixels, that is, (x, y)=(4, 4) corresponds to the position of the pixel for attention.

The pixel used in the texture direction determination is represented by W. At the pixel position (x, y), the vertical direction differential value gradV(x, y) is acquired by the following formula:

$$gradV(x,y)=abs(w(x,y-1)-w(x,y+1))$$

where abs( ) is a function of acquiring an absolute value, w(x, y−1) is a pixel value (intensity) of W at the coordinate position (x, y−1), and w(x, y+1) is a pixel value (intensity) of W at the coordinate position (x, y+1).

The vertical direction differential value calculating unit 312 acquires the differential value gradV at the pixel positions indicated by symbol O in FIG. 7.

For example, at the position of symbol O of the position of (x, y)=(1, 2), the differential value gradV is acquired on the basis of the pixel values (intensities) of both neighboring W in the vertical direction.

That is, the differential value gradV(1, 2) is calculated using the pixel values of two W pixels of (x, y)=(1, 1) and (x, y)=(1, 3).

The differential values gradV are acquired at eighteen pixel positions indicated by symbol O in FIG. 7.

Next, the process of the upper right direction differential value calculating unit 313 calculating the differential value in the upper right direction will be described.

Figure 8:
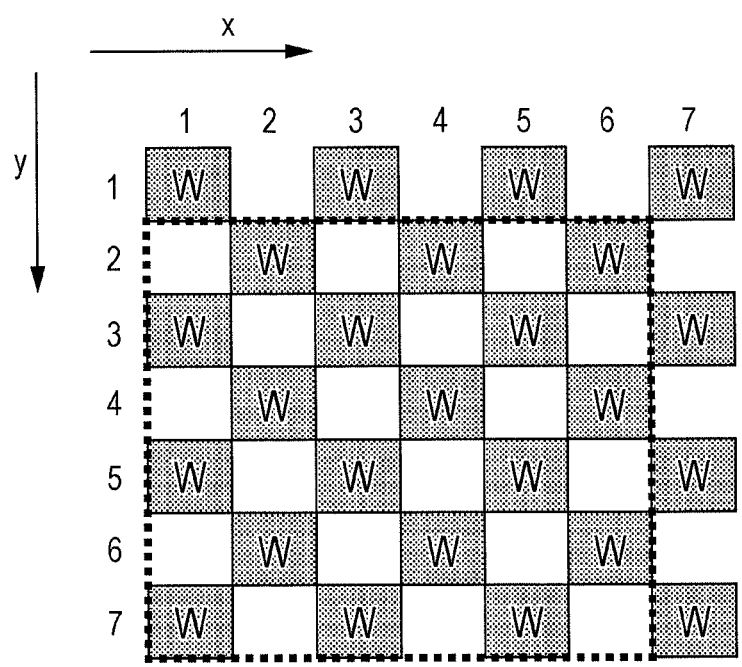
FIG. 8 is a diagram illustrating an upper right direction differential value calculating process performed in the texture direction determining process performed by the image processing device according to the embodiment of the present disclosure.

FIG. 8 is a diagram illustrating the process of the upper right direction differential value calculating unit 313. FIG. 8 shows the neighboring area of/pixels centered on the pixel for attention.

The horizontal direction is represented by the x coordinate, and the vertical direction is represented by the y coordinate. The center of the neighboring area of 7×7 pixels, that is, (x, y)=(4, 4) corresponds to the position of the pixel for attention.

The pixel used in the texture direction determination is represented by W. At the pixel position (x, y), the upper right direction differential value gradA(x, y) is acquired by the following formula:

$$gradA(x,y)=abs(w(x,y)-w(x+1,y-1))$$

where abs( ) is a function of acquiring an absolute value, w(x, y) is a pixel value (intensity) of W at the coordinate position (x, y), and w(x+1, y−1) is a pixel value (intensity) of W at the coordinate position (x+1, y−1).

The upper right direction differential value calculating unit 313 acquires the differential value gradA at the W pixel positions within a dotted line in FIG. 8.

For example, at the position of symbol W of the position of (x, y)=(1, 3), the differential value gradA is acquired on the basis of the pixel values (intensities) of the pixel itself and the upper right adjacent W.

That is, the differential value gradA(1, 3) is calculated using the pixel values of two W pixels of (x, y)=(1, 3) and (x, y)=(2, 2).

The differential values gradA are acquired at eighteen W pixel positions within a dotted line shown in FIG. 8.

Next, the process of the lower right direction differential value calculating unit 314 calculating the differential value in the lower right direction will be described.

Figure 9:
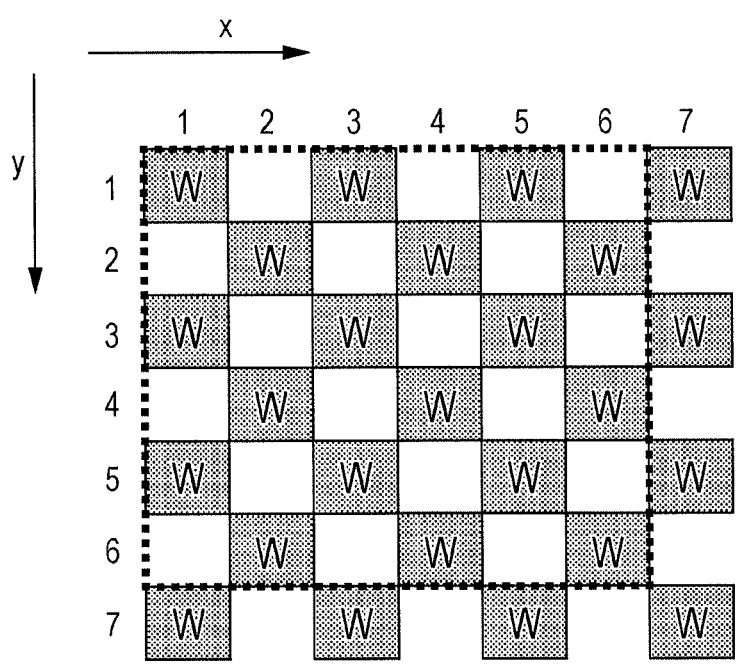
FIG. 9 is a diagram illustrating a lower right direction differential value calculating process performed in the texture direction determining process performed by the image processing device according to the embodiment of the present disclosure.

FIG. 9 is a diagram illustrating the process of the lower right direction differential value calculating unit 314. FIG. 9 shows the neighboring area of 7×7 pixels centered on the pixel for attention.

The horizontal direction is represented by the x coordinate, and the vertical direction is represented by the y coordinate. The center of the neighboring area of 7×7 pixels, that is, (x, y)=(4, 4) corresponds to the position of the pixel for attention.

The pixel used in the texture direction determination is represented by W. At the pixel position (x, y), the lower right direction differential value gradD(x, y) is acquired by the following formula:

$$gradD(x,y)=abs(w(x,y)-w(x+1,y+1))$$

where abs( ) is a function of acquiring an absolute value, w(x, y) is a pixel value (intensity) of W at the coordinate position (x, y), and w(x+1, y+1) is a pixel value (intensity) of W at the coordinate position (x+1, y+1).

The lower right direction differential value calculating unit 314 acquires the differential value gradD at the W pixel position within a dotted line in FIG. 9.

For example, at the position of symbol W of the position of (x, y)=(1, 1), the differential value gradD is acquired on the basis of the pixel values (intensities) of the pixel itself and the lower right adjacent W.

That is, the differential value gradD(1, 1) is calculated using the pixel values of two W pixels of (x, y)=(1, 1) and (x, y)=(2, 2).

The differential values gradD are acquired at eighteen W pixel positions within a dotted line shown in FIG. 9.

Next, the processes of the statistic calculating units 321a to 321d will be described.

The statistic calculating units 321a to 321d perform sorting, on the basis of the magnitudes of the differential values, on the differential values gradH, gradV, gradA, and gradD respectively calculated by the differential value calculating units of:

(1) Horizontal Direction Differential Value Calculating Unit 311, (2) Vertical Direction Differential Value Calculating Unit 312, (3) Upper Right Direction Differential Value Calculating Unit 313, and (4) Lower Right Direction Differential Value Calculating Unit 314.

Average values mHgrad, mVgrad, mAgrad, and mDgrad are calculated using the differential values to the n-th differential value in ascending order.

As described with reference to FIG. 6 to FIG. 9, the following differential values are calculated by the pixel analysis of the 7×7 neighboring area centered on one pixel for attention:

(1) Eighteen Horizontal Direction Differential Values gradH of Horizontal Direction Differential Calculating Unit 311, (2) Eighteen Vertical Direction Differential Values gradV of Vertical Direction Differential Calculating Unit 312, (3) Eighteen Upper Right Direction Differential Values gradA of Upper Right Direction Differential Calculating Unit 313, and (4) Eighteen Lower Right Direction Differential Values gradD of Right down Direction Differential Calculating Unit 314.

The statistic calculating units 321a to 321d perform sorting on the basis of the magnitudes of the differential values as the statistics based on the plurality of differential values, and calculate the average differential values mHgrad, mVgrad, mAgrad, and mDgrad using the differential values to the n-th value in ascending order.

Herein, n is a value equal to or less than the length N of the sorted differential values. In the example, N is 18.

The value of n is determined depending on the magnitude of a continuous defect assumed to be included in the neighboring area 211. For example, when the continuous defective pixels included in the neighboring area pixels are 2×2 pixels, the differential values which are not accurately acquired by the influence of the defect are maximal 4 pixels, and thus n=N−4.

Next, the process of the statistic comparing unit 331 will be described.

The statistic comparing unit 331 compares the statistics mHgrad, mVgrad, mAgrad, and mDgrad calculated by the statistic calculating units 321a to 321d in the horizontal, vertical, upper right, and lower right directions as described above, and determines a direction with the smallest statistic as the texture direction.

For example, when the mHgrad is the smallest value, the texture direction of the neighboring area 211 is determined as the horizontal direction.

The texture direction determining unit 202 in the defect correcting unit 118 determines the texture direction as described above, and outputs texture direction information (dir) as determination information to the defective pixel detecting unit 203.

The texture direction information (dir) corresponds to a direction with the smallest brightness change or pixel value change.

6. Details of Process performed by Defective Pixel Detecting Unit in Defect Correcting Unit Next, details of the process performed by the defective pixel detecting unit 203 in the defect correcting unit 118 will be described with reference to FIG. 10.

Figure 10:
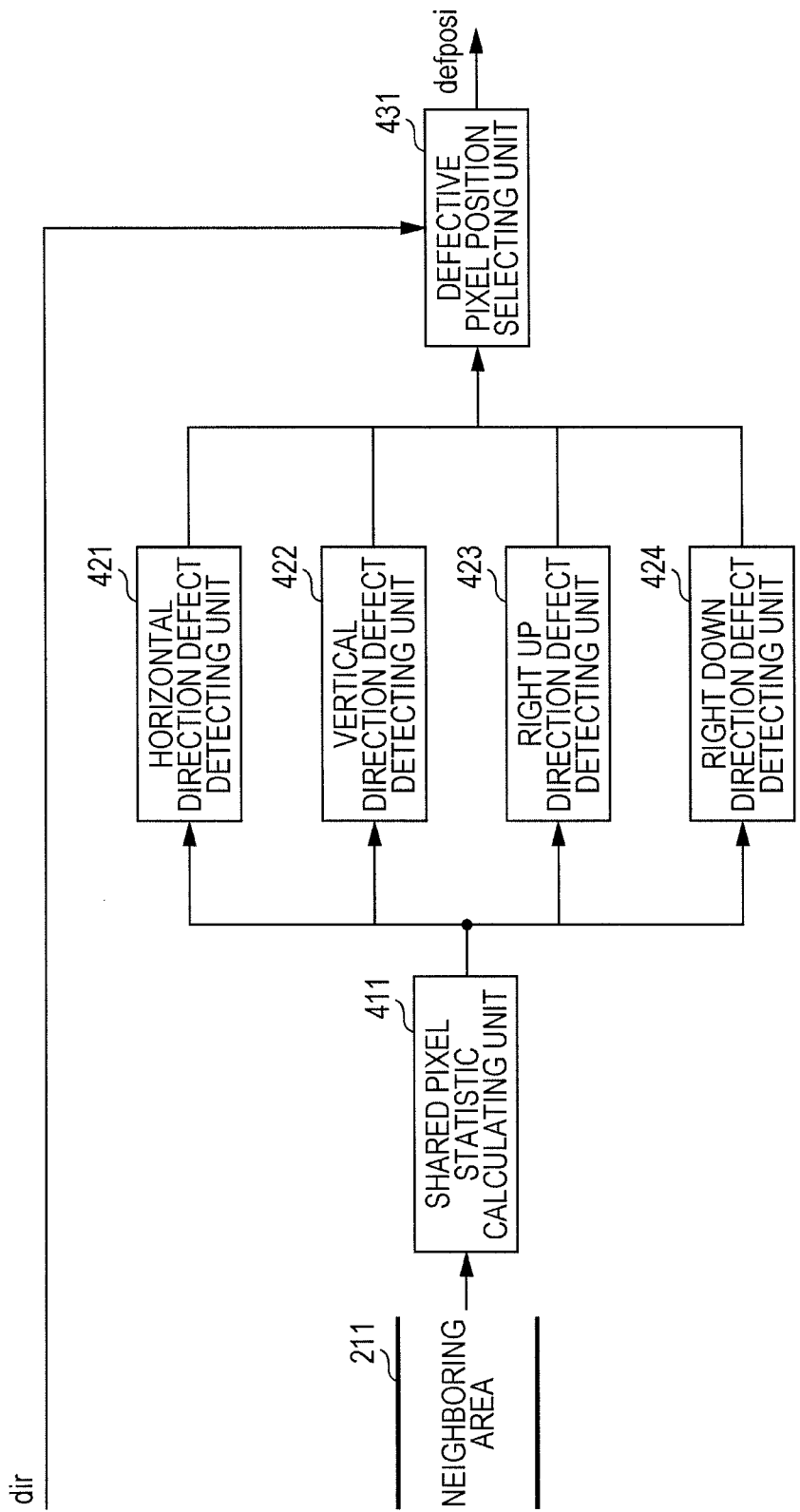
FIG. 10 is a diagram specifically illustrating a process performed by a defective pixel detecting unit in a defect correcting unit of the image processing device according to the embodiment of the present disclosure.

FIG. 10 is a diagram illustrating a process performed by the defective pixel detecting unit 203 and a configuration thereof.

The defective pixel detecting unit 203 performs the process on the pixels constituting the neighboring area 211 (in the example, the area of 7×7 pixels centered on the pixel for attention) for each sharing pixel group formed of a plurality of pixels sharing a pixel output reading circuit (sharing FD). The sharing pixel group is a group of pixels sharing the reading circuit.

The sharing pixel statistic calculating unit 411 calculates a statistic for each sharing pixel group formed of a plurality of pixels sharing the pixel output reading circuit (sharing FD).

In addition, the defective pixel detecting unit 203 includes the following units that use the statistics calculated by the sharing pixel statistic calculating unit 411 and detect pixels estimated to be defective in the respective directions in the neighboring area 211. That is, the following defect detecting units corresponding to four directions are provided:

(1) Horizontal Direction Defect Detecting Unit 421 performing Defect Detection in Horizontal Direction, (2) Vertical Direction Defect Detecting Unit 422 performing Defect Detection in Vertical Direction, (3) Upper Right Direction Defect Detecting Unit 423 performing Defect Detection in Upper Right Direction, and (4) Lower Right Direction Defect Detecting Unit 424 performing Defect Detection in Lower Right Direction.

In addition, the defective pixel detecting unit 203 includes a defective pixel position selecting unit 431 that inputs the texture direction information (dir) determined by the texture direction determining unit 202 described above and selects a correction target defective pixel position to be a correction target from the pixel estimated to be the defective pixels by the defective detecting units 421 to 424 at the preceding stage.

For example, as a sharing pixel configuration of the solid-state imaging device, there is a pixel configuration in units of 8 pixels.

Figure 11:
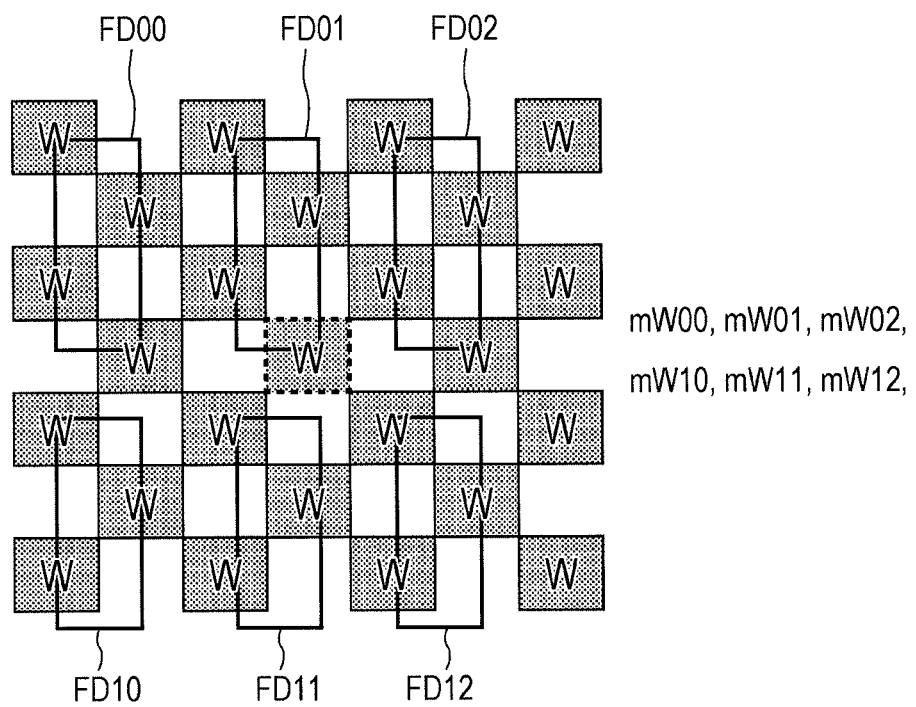
FIG. 11 is a diagram illustrating an example of a process performed by the defective pixel detecting unit in the defect correcting unit of the image processing device according to the embodiment of the present disclosure.

FIG. 11 shows an example of a configuration in which 8 pixels connected by a solid line indicate the sharing pixels.

That is, the example shown in FIG. 11 describes a configuration of a sharing pixel group including 8 pixels and using one pixel output reading circuit (sharing FD).

In the case of a sharing pixel pattern shown in FIG. 11, the pixel group of the sharing pixels (8 pixels) including the pixel for attention is FD01.

Pixel groups of the sharing pixels in the neighboring left, lower left, down, lower right, and right directions of the pixel group of the sharing pixels FD01 including the pixel for attention are sequentially indicated by FD00, FD10, FD11, FD12, and FD22.

That is, in the 7×7 pixel area centered on the pixel for attention, the pixel groups of the sharing pixels (8 pixels) such as FD00, FD01, and FD02 from the upper left side and FD10, FD11, and FD12 from the lower left side are set.

When a pixel output reading circuit is shared by a sharing pixel group, there is a case where one pixel of the group is defective, or a case where an output value is set to a value away from a normal value due to a defect of the reading circuit. For example, all the constituent pixels of the pixel group FD00 shown in FIG. 11 may be defective pixels.

Hereinafter, an example of a process when one of the pixel groups FD01 and FD11 is defective will be described.

First, the sharing pixel statistic calculating unit 411 calculates a pixel value average value of W pixels for each sharing pixel group in the neighboring area 211. In the example, the neighboring area 211 is the 7×7 pixel area centered on the pixel for attention.

For example, mW01 is an average value of the W pixels included in the sharing pixel group (FD01) including the center pixel surrounded by a dotted line in the pixel area formed of 7×7 pixels shown in FIG. 11. The sharing pixel group is a group of the pixels sharing the reading circuit as described above.

Similarly, mW00 is the average value of W pixels included in the pixel sharing group (FD00);

mW01 is the average value of W pixels included in the pixel sharing group (FD01);

mW02 is the average value of W pixels included in the pixel sharing group (FD02);

mW10 is the average value of W pixels included in the pixel sharing group (FD10);

mW11 is the average value of W pixels included in the pixel sharing group (FD11); and mW12 is the average value of W pixels included in the pixel sharing group (FD12).

An average value group formed of six average values (mW00 to mW12) of the respective sharing pixel groups is an average value group 1.

That is, the average value group 1 is formed of the average values of total 2×3 pixel sharing groups: the pixel sharing group (FD01) including the pixel for attention (center pixel surrounded with the dotted line in the 7×7 pixel area shown in FIG. 11) and the adjacent sharing pixel groups of the left (FD00), lower left (FD10), down (FD11), lower right (FD12), and right (FD02) directions thereof.

The average value group 1 is calculated corresponding to the six sharing pixel groups FD00 to FD12 shown in FIG. 11. Alternatively, a configuration using an average value group 2 may be formed by using the average values of total 2×3 pixel sharing groups: the sharing pixel group (FD01) including the pixel for attention, and the adjacent sharing pixel groups of the left (FD00), upper left (not shown, above FD00), up (not shown, above FD01), upper right (not shown, above FD02), and right (FD02).

Whether to use the average value group 1 or the average value group 2 is determined depending on a phase of the pixel for attention and a pattern of the sharing pixel. That is, the average value of the W pixels sharing the FD00 is represented by mW00, and the average value of the W pixels sharing another FD is represented in the same manner.

The process of the horizontal direction defect detecting unit 421 will be described. First, the horizontal direction defect detecting unit 421 calculates horizontal direction difference values (gradients: gH00 to gH11) of the following sharing pixel groups on the basis of 2×3 average values (mW00 to mW12) calculated by the sharing pixel statistic calculating unit 411 of the preceding stage. That is, gH00=abs(mW00−mW01), gH01=abs(mW01−mW02), gH10=abs(mW10−mW11), and gH11=abs(mW11−mW12) are calculated.

The difference values (gradients) correspond to first-order differential values.

The horizontal direction defect detecting unit 421 calculates the following difference average values on the basis of the horizontal direction difference values (gradients: gH00 to gH11) of the respective sharing pixel groups:

Average Value of Upper Horizontal Direction Difference Values (gradients: gH00 and gH01)

$$gH0=(gH00+gH01)/2$$

Average Value of Lower Horizontal Direction Difference Values (gradients: gH10 and gH11)

$$gH1=(gH10+gH11)/2$$

The horizontal direction defect detecting unit 421 compares the following:

Difference Average Value (gH0=(gH00+gH01)/2) that is Average Value of Upper Horizontal Direction Difference Values (gradients), and Difference Average Value (gH1=(gH10+gH11)/2) that is Average Value of Lower Horizontal Direction Difference Values (gradients).

The horizontal direction defect detecting unit 421 calculates the horizontal direction defect detecting average value (safe_mW) as follows in accordance with the comparison result.

(a) if gH0<gH1, $$safe\_mW=(mW00+mW01+mW02)/3, and$$

(b) if gH0>gH1, $$safe\_mW=(mW10+mW11+mW12)/3.$$

According to any of the above (a) and (b), the horizontal direction defect detecting average value safe_mW is acquired.

The process is a process of selecting a flat area with a smaller change in pixel values from the upper and lower pixel areas, and calculating the average value as the horizontal direction defect detecting average value (safe_mW).

Then, the horizontal direction defect detecting unit 421 determines that the sharing pixel group FD01 has a defect, when the difference average value (gH0) of the upper horizontal direction difference values (gradients) of the upper sharing pixel groups including the sharing pixel group (FD01) of the defect determination target is equal to or larger than a predetermined threshold value and the following condition formula is satisfied:

$$abs(mW01-safe\_mW)>abs(mW00-safe\_mW)$$

The determination process is a process of determining that the sharing pixel group (FD01) of the defect determination target has a defect, when the difference average value (gH0) of the upper horizontal direction difference values (gradients) of the upper sharing pixel groups including the sharing pixel group (FD01) of the defect determination target is equal to or larger than a predetermined threshold value and the difference between the pixel value average (mW01) of the sharing pixel group (FD01) of the defect determination target and the horizontal direction defect detecting average value (safe_mW) is larger than the difference between the pixel value average (mW00) of the left sharing pixel group (FD00) adjacent to the sharing pixel group (FD01) in the horizontal direction and the horizontal direction defect detecting average value (safe_mW).

When the difference average value (gH1) of the lower horizontal direction difference values (gradients) of the lower sharing pixel groups including the sharing pixel group (FD11) of the defect determination target is equal to or larger than a predetermined threshold value and the following condition formula is satisfied, the sharing pixel group (FD11) is determined to have a defect.

$$abs(mW11-safe\_mW)>abs(mW10-safe\_mW)$$

The determination process is a process of determining that the sharing pixel group (FD11) of the defect determination target has a defect, when the difference average value (gH1) of the lower horizontal direction difference values (gradients) is equal to or larger than a predetermined threshold value and the difference between the pixel value average (mW11) of the sharing pixel group (FD11) of the defect determination target and the horizontal direction defect detecting average value (safe_mW) is larger than the difference between the pixel value average (mW10) of the left sharing pixel group (FD10) adjacent to the sharing pixel group (FD11) and the horizontal direction defect detecting average value (safe_mW).

Next, the process of the vertical direction defect detecting unit 422 will be described.

The vertical direction defect detecting unit 422 calculates vertical direction difference values (gradients: gV0 and gV1) of the following sharing pixel groups on the basis of 2×3 average values (mW00 to mW12) calculated by the sharing pixel statistic calculating unit 411 of the preceding stage. That is, the vertical direction defect detecting unit 422 calculates the vertical direction difference value (gradient) of the sharing pixel groups (FD00 and FD10) of the left column: gV0, gV0=abs(mW00−mW10), and the vertical direction difference value (gradient) of the sharing pixel groups (FD01 and FD11) of the right column: gV1, gV1=abs(mW01−mW11).

Furthermore, the vertical direction defect detecting unit 422 compares two vertical direction difference values (gradients: gV0 and gV1) of the respective sharing pixel groups, and calculates the following vertical direction defect detecting average value (safe_mW) on the basis of the comparison result.

(a) if gV0<gV1, safe_mW=(mW00+mW10)/2, and (b) if gV0>gV1, safe_mW=(mW01+mW11)/2.

According to any of the above (a) and (b), the vertical direction defect detecting average value safe_mW is acquired.

The process is a process of selecting a flat area with a smaller change in pixel values from pixel areas of the columns of the sharing pixel groups in two vertical columns adjacent to each other, that is, the left column including the sharing pixel groups (FD00 and FD10) and the right column including the sharing pixel groups FD01 and FD11, and calculating the average value as the vertical direction detect detecting average value (safe_mW).

Then, the vertical direction defect detecting unit 422 determines that the sharing pixel group (FD01) has a defect, when the vertical direction difference value (gradient) gV1 of the column including the sharing pixel group (FD01) of the defect determination target is equal to or larger than a predetermined threshold value and the following condition formula is satisfied:

abs(mW01−safe_mW)>abs(mW11−safe_mW)

The determination process is a process of determining that the sharing pixel group (FD01) of the defect determination target has a defect, when the vertical direction difference value (gradient) (gV1) of the vertical direction column including the sharing pixel group (FD01) of the defect determination target is equal to or larger than a predetermined threshold value and the difference between the pixel value average (mW01) of the sharing pixel group (FD01) of the defect determination target and the vertical direction defect detecting average value (safe_mW) is larger than the difference between the pixel value average (mW11) of the lower sharing pixel group (FD11) adjacent to the sharing pixel group (FD01) in the vertical direction and the vertical direction defect detecting average value (safe_mW).

Then, the vertical direction defect detecting unit 422 determines that the sharing pixel group (FD11) has a defect, when the vertical direction difference value (gradient) gV1 of the column including the sharing pixel group (FD11) of the defect determination target is equal to or larger than a predetermined threshold value and the following condition formula is satisfied:

abs(mW11−safe_mW)>abs(mW01−safe_mW)

The determination process is a process of determining that the sharing pixel group (FD11) of the defect determination target has a defect, when the vertical direction difference value (gradient) (gV1) of the vertical direction column including the sharing pixel group (FD11) of the defect determination target is equal to or larger than a predetermined threshold value and the difference between the pixel value average (mW11) of the sharing pixel group (FD11) of the defect determination target and the vertical direction defect detecting average value (safe_mW) is larger than the difference between the pixel value average (mW01) of the upper sharing pixel group (FD01) adjacent to the sharing pixel group (FD11) in the vertical direction and the vertical direction defect detecting average value (safe_mW).

Next, the process of the upper right direction defect detecting unit 423 will be described.

The upper right direction defect detecting unit 423 calculates upper right direction difference values (gradients: gA0 and gA1) of the following sharing pixel groups on the basis of 2×3 average values (mW00 to mW12) calculated by the sharing pixel statistic calculating unit 411 of the preceding stage. That is, the upper right direction defect detecting unit 423 calculates the upper right direction difference value (gradient) of the sharing pixel groups (FD10 and FD01) adjacent in the upper right direction: gA0, gA0=abs(mW10−mW01), and the upper right direction difference value (gradient) of the sharing pixel groups (FD11 and FD02) adjacent in the upper right direction: gA1, gA1=abs(mW11−mW02).

The upper right direction defect detecting unit 423 compares two upper right direction difference values (gradients: gA0 and gA1) of the respective sharing pixel groups, and calculates the following upper right direction defect detecting average value (safe_mW) on the basis of the comparison result.

(a) if gA0<gA1, safe_mW=(mW10+mW01)/2, and (b) if gA0>gA1, safe_mW=(mW11+mW02)/2.

According to any of the above (a) and (b), the upper right direction defect detecting average value safe_mW is acquired.

The process is a process of selecting a flat area with a smaller change in pixel values from the adjacent data of sharing pixel groups in two upper right direction lines, that is, the sharing pixel groups (FD10 and FD01) and the sharing pixel groups (FD11 and FD02), and calculating the average value as the upper right direction defect detecting average value (safe_mW).

Then, the upper right direction defect detecting unit 423 determines that the sharing pixel group FD01 has a defect, when the upper right direction difference value (gradient) gA0 of the sharing pixel groups including the sharing pixel group (FD01) of the defect determination target is equal to or larger than a predetermined threshold value and the following condition formula is satisfied:

abs(mW01−safe_mW)>abs(mW10−safe_mW)

The determination process is a process of determining that the sharing pixel group (FD01) of the defect determination target has a defect, when the upper right direction difference value (gradient) (gA1) in the upper right direction including the sharing pixel group (FD01) of the defect determination target is equal to or larger than a predetermined threshold value and the difference between the pixel value average (mW01) of the sharing pixel group (FD01) of the defect determination target and the upper right direction defect detecting average value (safe_mW) is larger than the difference between the pixel value average (mW10) of the lower left sharing pixel group (FD10) adjacent to the sharing pixel group (FD01) in the upper right direction and the upper right direction defect detecting average value (safe_mW).

Then, the upper right direction defect detecting unit 423 determines that the sharing pixel group FD11 has a defect, when the upper right direction difference value (gradient) gA1 of the sharing pixel groups in the upper right direction including the sharing pixel group (FD11) of the defect determination target is equal to or larger than a predetermined threshold value and the following condition formula is satisfied:

$$abs(mW11-safe\_mW) > abs(mW02-safe\_mW)$$

The determination process is a process of determining that the sharing pixel group (FD11) of the defect determination target has a defect, when the upper right direction difference value (gradient) (gA1) in the upper right direction including the sharing pixel group (FD11) of the defect determination target is equal to or larger than a predetermined threshold value and the difference between the pixel value average (mW11) of the sharing pixel group (FD11) of the defect determination target and the upper right direction defect detecting average value (safe_mW) is larger than the difference between the pixel value average (mW02) of the upper right sharing pixel group (FD02) adjacent to the sharing pixel group (FD11) in the upper right direction and the upper right direction defect detecting average value (safe_mW).

Next, the process of the lower right direction defect detecting unit 424 will be described.

The lower right direction defect detecting unit 424 calculates lower right direction difference values (gradients: gD0 and gD1) of the following sharing pixel groups on the basis of 2×3 average values (mW00 to mW12) calculated by the sharing pixel statistic calculating unit 411 of the preceding stage. That is, the lower right direction defect detecting unit 424 calculates the lower right direction difference value (gradient) of the sharing pixel groups (FD00 and FD11) adjacent in the lower right direction: gD0, gD0=abs(mW00−mW11), and the lower right direction difference value (gradient) of the sharing pixel groups (FD01 and FD12) adjacent in the lower right direction: gD1, gD1=abs(mW01−mW12).

The lower right direction defect detecting unit 424 compares two lower right direction difference values (gradients: gD0 and gD1) of the respective sharing pixel groups, and calculates the following lower right direction defect detecting average value (safe_mW) on the basis of the comparison result.

(a) if gD0<gD1, $$safe\_mW=(mW00+mW11)/2, \text{ and}$$

(b) if gD0>gD1, $$safe\_mW=(mW01+mW12)/2.$$

According to any of the above (a) and (b), the lower right direction defect detecting average value safe_mW is acquired.

The process is a process of selecting a flat area with a smaller change in pixel values from the adjacent data of sharing pixel groups in two lower right direction lines, that is, the pixel sharing groups (FD00 and FD11) and the pixel sharing groups (FD01 and FD12), and calculating the average value as the vertical direction defect detecting average value (safe_mW).

Then, the lower right direction defect detecting unit 424 determines that the pixel sharing group FD01 has a defect, when the lower right direction difference value (gradient) gD1 of the sharing pixel groups in the lower right direction including the sharing pixel group (FD01) of the defect determination target is equal to or larger than a predetermined threshold value and the following condition formula is satisfied.

$$abs(mW01-safe\_mW) > abs(mW12-safe\_mW)$$

The determination process is a process of determining that the sharing pixel group (FD01) of the defect determination target has a defect, when the lower right direction difference value (gradient) (gD1) of the sharing pixel groups in the lower right direction including the sharing pixel group (FD01) of the defect determination target is equal to or larger than a predetermined threshold value and the difference between the pixel value average (mW01) of the sharing pixel group (FD01) of the defect determination target and the lower right direction defect detecting average value (safe_mW) is larger than the difference between the pixel value average (mW12) of the lower right sharing pixel group (FD12) adjacent to the sharing pixel group (FD01) in the lower right direction and the lower right direction defect detecting average value (safe_mW).

Then, the lower right direction defect detecting unit 424 determines that the sharing pixel group FD11 has a defect, when the lower right direction difference value (gradient) gD0 of the sharing pixel groups including the sharing pixel group (FD11) of the defect determination target is equal to larger than a predetermined threshold value and the following condition formula is satisfied:

$$abs(mW11-safe\_mW) > abs(mW00-safe\_mW)$$

The determination process is a process of determining that the sharing pixel group (FD11) of the defect determination target has a defect, when the lower right direction difference value (gradient) (gD0) of the sharing pixel groups in the lower right direction including the sharing pixel group (FD11) of the defect determination target is equal to or larger than a predetermined threshold value and the difference between the pixel value average (mW11) of the sharing pixel group (FD11) of the defect determination target and the lower right direction defect detecting average value (safe_mW) is larger than the difference between the pixel value average (mW00) of the upper left sharing pixel group (FD00) adjacent to the sharing pixel group (FD11) in the lower right direction and the lower right direction defect detecting average value (safe_mW).

Next, the process of the defective pixel position selecting unit 431 will be described.

The defective pixel position selecting unit 431 selects the detection result of the texture direction (dir) determined by the texture direction determining unit 202 described above, from the pixel positions detected by the defect detecting units 421 to 424 of the respective directions described above.

That is, when the texture direction (dir) determined by the texture direction determining unit 202 is the horizontal direction (H), the detection result of the horizontal direction defect detecting unit 421 is selected. That is, when the horizontal direction defect detecting unit 421 determines that the sharing pixel group FDxy (for example, FD01) has a defective pixel, the sharing pixel group FDxy is selected as the sharing pixel group having the defective pixel of the correction target.

When the texture direction (dir) determined by the texture direction determining unit 202 is the vertical direction (V), the detection result of the vertical direction defect detecting unit 422 is selected. That is, when the vertical direction defect detecting unit 422 determines that the sharing pixel group FDxy (for example, FD01) has a defective pixel, the sharing pixel group FDxy is selected as the sharing pixel group having the defective pixel of the correction target.

When the texture direction (dir) determined by the texture direction determining unit 202 is the upper right direction (A), the detection result of the upper right direction defect detecting unit 423 is selected. That is, when the upper right direction defect detecting unit 423 determines that the sharing pixel group FDxy (for example, FD01) has a defective pixel, the sharing pixel group FDxy is selected as the sharing pixel group including the defective pixel of the correction target.

When the texture direction (dir) determined by the texture direction determining unit 202 is the lower right direction (D), the detection result of the lower right direction defect detecting unit 424 is selected. That is, when the lower right direction defect detecting unit 424 determines that the sharing pixel group FDxy (for example, FD01) has a defective pixel, the sharing pixel group FDxy is selected as the sharing pixel group including the defective pixel of the correction target.

The selection process of the correction target defective pixel performed by the defective pixel position selecting unit 431 is a process of determining that only a pixel at a position in a direction corresponding to the texture direction (dir) determined by the texture direction determining unit 202 has a high probability of being an actually defective pixel, from the pixels estimated as pixels having a defect by the defect detecting units 421 to 424, and selecting the pixel as the correction target.

The selection process will be described.

In the defect detecting units 421 to 424, the sharing pixel group with a large change in pixel values in the corresponding direction is set as the sharing pixel group probably having a defective pixel, and the pixel group is determined as the group including the defective pixel.

However, the defective pixel determined by the defect detecting units 421 to 424 may not be a defective pixel to be corrected and may output a true value.

The defective pixel position selecting unit 431 selects a sharing pixel group including a defective pixel to be corrected from the sharing pixel groups including pixels determined as the defective pixels by the defect detecting units 421 to 423. For the selection process, the texture direction information (dir) is applied.

The texture direction is originally a direction with a small change in pixel values.

In the defect detecting units 421 to 424, the sharing pixel group with a large change in pixel values in the corresponding direction is estimated as the group probably having a defective pixel, and these are determined as the defective pixels.

The defective pixel position selecting unit 431 selects only a sharing pixel group corresponding to the texture direction from the outputs of the defect detecting units 421 to 424, as a sharing pixel group having an actual defective pixel to be corrected. The other groups are determined to be highly probably outputting the actual pixel value and are excepted from the correction target.

In the configuration of the defective pixel detecting unit 203 described with reference to FIG. 10, the pixel group estimated to have a defective pixel is determined in the detecting units of the horizontal direction defect detecting unit 421, the vertical direction defect detecting unit 422, the upper right direction defect detecting unit 423, and the lower right direction defect detecting unit 424, and then one of the outputs of the detecting units 421 to 424 is selected and set as the correction target using the texture direction information in the defective pixel position selecting unit 431.

Alternatively, for example, in accordance with the texture direction information, the defect detecting unit performing the defect detection in the same direction as the texture direction may be selectively operated from the defect detecting units 421 to 424.

Figure 12:
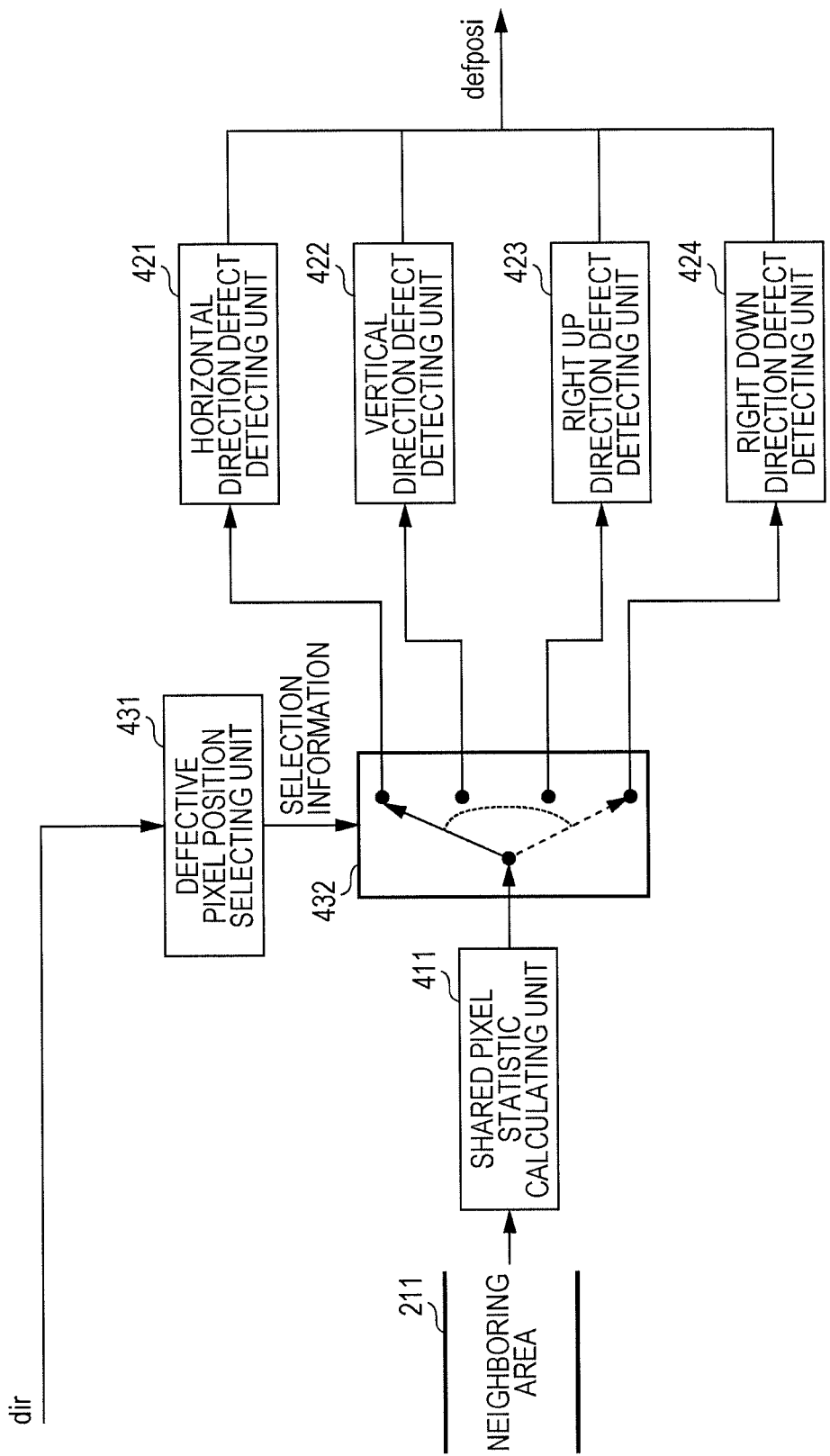
FIG. 12 is a diagram illustrating a modified example of the defective pixel detecting unit in the defect correcting unit of the image processing device according to the embodiment of the present disclosure.

For example, as shown in FIG. 12, whether to operate any of the defect detecting units 421 to 424 is determined using a switch 432 that is controlled in accordance with the texture direction information in the defective pixel position selecting unit 431 so as to operate any one of the detecting units 421 to 424.

In the embodiment, although the example of using the first-order differential value (gradient) in the defect detection is described, for example, a second-order differential value (Laplacian) may be used in addition to the first-order differential value (gradient).

7. Process of Defective Pixel Correcting Unit

The process of the defective pixel correcting unit 204 shown in FIG. 4 will be described.

The defective pixel correcting unit 204 performs correction on the defective pixel detected by the defective pixel detecting unit 203 described above.

The correcting unit 204 determines the correction pixel value using the neighboring pixels on the basis of the texture direction determined by the texture direction determining unit 202, with respect to the detected defective pixel.

As a method of determining the correction pixel value, various methods can be applied, for example, a correction process referring to the pixel values of the neighboring pixels can be applied. For example, a correction process such as a method of replacing the pixel value of the defective pixel with the pixel value of the pixel closest to the defective pixel position is performed in the texture direction. In addition, a process of selecting from 2×3 average values calculated by the sharing pixel statistic calculating unit 411 may be applied in the texture direction.

The present disclosure has been described in detail with reference to the specific embodiment. However, it is obvious that a person skilled in the art can correct and modify the embodiment within the scope which does not deviate from the main concept of the present disclosure. That is, the embodiment of the present disclosure is disclosed as an example, and thus should not be interpreted as limiting. To determine the main concept of the present disclosure, it is preferable to refer to Claims.

The series of processes described in the specification may be performed by hardware, software, or combination of both. When the process is performed by software, a program recording the process sequence may be installed and executed in a memory of a computer installed in dedicated hardware, or the program may be installed and executed in a general-purpose computer which can perform various processes. For example, the program may be recorded in advance in a recording medium. In addition to the installation from the recording medium to the computer, the program may be received through a network such as LAN (Local Area Network) and the Internet and may be installed in a recording medium such as a built-in hard disk.

Various processes described in the specification may not only be performed in time series according to the description, but also be performed in parallel or individually in accordance with the performance of the device performing the processes or as necessary. The system in the specification is a logical group configuration of a plurality of devices, and the constituent devices are not limited to being provided in the same casing.

The present disclosure contains subject matter related to that disclosed in Japanese Priority Patent Application JP 2011-006464 filed in the Japan Patent Office on Jan. 14, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
 a texture direction determining unit that determines a texture direction of an image;
 a defective pixel detecting unit that calculates a pixel value average for each of pixel groups including a plurality of pixels, and detects a defective pixel position on the basis of difference information of the pixel value average according to an arrangement direction of the pixel groups; and
 a correction unit that corrects, as a correction target, a pixel value at the defective pixel position detected on the basis of the difference information in the same pixel group arrangement direction as the texture direction determined by the texture direction determining unit.

2. The image processing device according to claim 1, wherein
 the defective pixel detecting unit calculates the pixel value average for each pixel group including the plurality of pixels sharing a pixel value reading circuit, and detects the defective pixel position on the basis of the difference information of the pixel value average according to the arrangement direction of the pixel group.

3. The image processing device according to claim 1, wherein
 the defective pixel detecting unit determines whether or not a pixel is a defective pixel in accordance with a difference value from a reference value (safe_mW), the reference value being an average value of a plurality of pixel groups in a flat area where a difference from the average value of the plurality of pixel groups is small in a plurality of adjacent arrangements of pixel groups in the same arrangement direction.

4. The image processing device according to claim 1, wherein the texture direction determining unit performs a process of determining one of four directions of horizontal, vertical, upper right, and lower right as the texture direction, and
 wherein the defective pixel detecting unit detects the defective pixel position on the basis of the difference information of the pixel value average according to the arrangement direction of the pixel groups in the four directions of horizontal, vertical, upper right, and lower right.

5. The image processing device according to claim 1, wherein
 the texture determining unit calculates a plurality of differential values based on pixel values of pixels arranged in a predetermined direction included in a neighboring area centered on a pixel for attention, sorts the plurality of differential values, selects only data with small values, calculates statistics, and determines the texture direction on the basis of comparison of the statistics.

6. The image processing device according to claim 1, wherein
 the correction unit performs a process of determining the pixel value at the defective pixel position with reference to a neighboring pixel in the texture direction as a reference pixel on the basis of the pixel value of the reference pixel.

7. The image processing device according to claim 1, wherein
 the defective pixel detecting unit calculates, as a process target, a pixel value average for each pixel group including a plurality of pixels in the same pixel group arrangement direction as the texture direction determined by the texture direction determining unit, and detects the defective pixel position on the basis of the difference information of the pixel value averages according to the arrangement direction of the pixel groups.

8. An image processing method performed in an image processing device, the method comprising:
 causing a texture direction determining unit to determine a texture direction of an image;
 causing a defective pixel detecting unit to calculate a pixel value average for each of pixel groups including a plurality of pixels and to detect a defective pixel position on the basis of difference information of the pixel value average according to an arrangement direction of the pixel groups; and
 causing a correction unit to correct, as a correction target, a pixel value at the defective pixel position detected on the basis of the difference information in the same pixel group arrangement direction as the texture direction determined by the texture direction determining unit.

9. A non-transitory computer-readable medium having embodied thereon a program, which when executed by a computer causes the computer to perform a method, the method comprising:
 causing a texture direction determining unit to determine a texture direction of an image;
 causing a defective pixel detecting unit to calculate a pixel value average for each of pixel groups including a plurality of pixels and to detect a defective pixel position on the basis of difference information of the pixel value average according to an arrangement direction of the pixel groups; and
 causing a correction unit to correct, as a correction target, the defective pixel position detected on the basis of the difference information in the same pixel group arrangement direction as the texture direction determined by the texture direction determining unit.

10. The image processing method according to claim 8, further comprising:
 causing the defective pixel detecting unit to calculate the pixel value average for each pixel group including the plurality of pixels sharing a pixel value reading circuit, and detect the defective pixel position on the basis of the difference information of the pixel value average according to the arrangement direction of the pixel group.

11. The image processing method according to claim 8, further comprising:
 causing the defective pixel detecting unit to determine whether or not a pixel is a defective pixel in accordance with a difference value from a reference value (safe_mW), the reference value being an average value of a plurality of pixel groups in a flat area where a difference from the average value of the plurality of pixel groups is small in a plurality of adjacent arrangements of pixel groups in the same arrangement direction.

12. The image processing method according to claim 8, further comprising:
 causing the texture direction determining unit to perform a process of determining one of four directions of horizontal, vertical, upper right, and lower right as the texture direction; and
 causing the defective pixel detecting unit to detect the defective pixel position on the basis of the difference information of the pixel value average according to the arrangement direction of the pixel groups in the four directions of horizontal, vertical, upper right, and lower right.

13. The image processing method according to claim 8, further comprising:

causing the texture determining unit to calculate a plurality of differential values based on pixel values of pixels arranged in a predetermined direction included in a neighboring area centered on a pixel for attention, sort the plurality of differential values, select only data with small values, calculate statistics, and determine the texture direction on the basis of comparison of the statistics.

14. The image processing method according to claim 8, further comprising:

causing the correction unit to perform a process of determining the pixel value at the defective pixel position with reference to a neighboring pixel in the texture direction as a reference pixel on the basis of the pixel value of the reference pixel.

15. The image processing method according to claim 8, further comprising:

causing the defective pixel detecting unit to calculate, as a process target, a pixel value average for each pixel group including a plurality of pixels in the same pixel group arrangement direction as the texture direction determined by the texture direction determining unit, and detect the defective pixel position on the basis of the difference information of the pixel value averages according to the arrangement direction of the pixel groups.

16. The non-transitory computer-readable medium according to claim 9, wherein the method further comprises:

causing the defective pixel detecting unit to calculate the pixel value average for each pixel group including the plurality of pixels sharing a pixel value reading circuit, and detect the defective pixel position on the basis of the difference information of the pixel value average according to the arrangement direction of the pixel group.

17. The non-transitory computer-readable medium according to claim 9, wherein the method further comprises:

causing the defective pixel detecting unit to determine whether or not a pixel is a defective pixel in accordance with a difference value from a reference value (safe_mW), the reference value being an average value of a plurality of pixel groups in a flat area where a difference from the average value of the plurality of pixel groups is small in a plurality of adjacent arrangements of pixel groups in the same arrangement direction.

18. The non-transitory computer-readable medium according to claim 9, wherein the method further comprises:

causing the texture direction determining unit to perform a process of determining one of four directions of horizontal, vertical, upper right, and lower right as the texture direction; and causing the defective pixel detecting unit to detect the defective pixel position on the basis of the difference information of the pixel value average according to the arrangement direction of the pixel groups in the four directions of horizontal, vertical, upper right, and lower right.

19. The non-transitory computer-readable medium according to claim 9, wherein the method further comprises:

causing the texture determining unit to calculate a plurality of differential values based on pixel values of pixels arranged in a predetermined direction included in a neighboring area centered on a pixel for attention, sort the plurality of differential values, select only data with small values, calculate statistics, and determine the texture direction on the basis of comparison of the statistics.

20. The non-transitory computer-readable medium according to claim 9, wherein the method further comprises:

causing the correction unit to perform a process of determining the pixel value at the defective pixel position with reference to a neighboring pixel in the texture direction as a reference pixel on the basis of the pixel value of the reference pixel.

21. The non-transitory computer-readable medium according to claim 9, wherein the method further comprises:

causing the defective pixel detecting unit to calculate, as a process target, a pixel value average for each pixel group including a plurality of pixels in the same pixel group arrangement direction as the texture direction determined by the texture direction determining unit, and detect the defective pixel position on the basis of the difference information of the pixel value averages according to the arrangement direction of the pixel groups.

* * * * *